United States Patent
Maeda

[19]

[11] Patent Number: 6,160,566
[45] Date of Patent: Dec. 12, 2000

[54] REGISTRY ADJUSTING DEVICE FOR LASER BEAM PRINTER

[75] Inventor: Takami Maeda, Fukuoka, Japan

[73] Assignee: Matsushita Electric Industrial Co., Ltd., Osaka, Japan

[21] Appl. No.: 09/364,137

[22] Filed: Jul. 30, 1999

[30]    Foreign Application Priority Data

Jul. 30, 1998    [JP]    Japan ................................ 10-215240

[51] Int. Cl.$^7$ ....................................................... B41J 2/47
[52] U.S. Cl. .......................................................... 347/234
[58] Field of Search ................................. 347/234, 235, 347/232, 116, 118

[56]             References Cited

U.S. PATENT DOCUMENTS 5,764,270    6/1998    Kitagawa et al. ...................... 347/234

FOREIGN PATENT DOCUMENTS 7-160084    6/1995    Japan .

*Primary Examiner*—David F. Yockey
*Attorney, Agent, or Firm*—Ratner & Prestia

[57]             ABSTRACT

A phase-difference-measuring-circuit counts time-lags of beam-detect-signals with regard to a reference beam-detect-signal based on a reference clock. The counted values are stored in respective registers. When register-load-signals are set to "active", the stored values are loaded to pulse-generating-circuits, and counters in the pulse-generating-circuits count down the stored values based on the reference clock. During this count down operation, pulse-generating-circuits output one-shot-pulse-signals. When the on-shot-pulse-signals stays active, frequency dividers are set to "disable" and stop their operations. Duties of motor clocks driving rotary polygons in laser-beam-scanning-units are temporarily varied during this period, and the motor clocks are outputted with phase delay corresponding to this period, thereby correcting phase deviation in the main scan direction of the polygons.

6 Claims, 9 Drawing Sheets

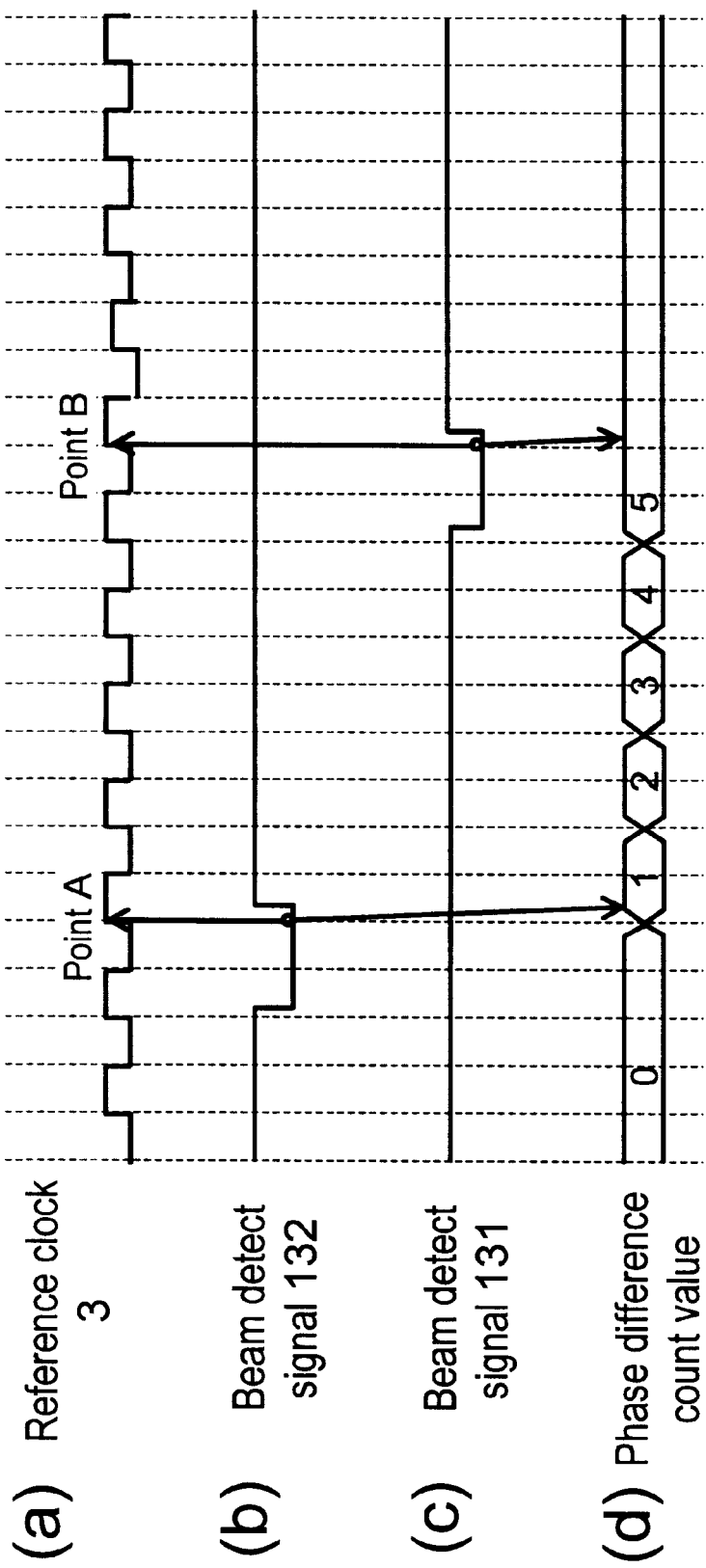

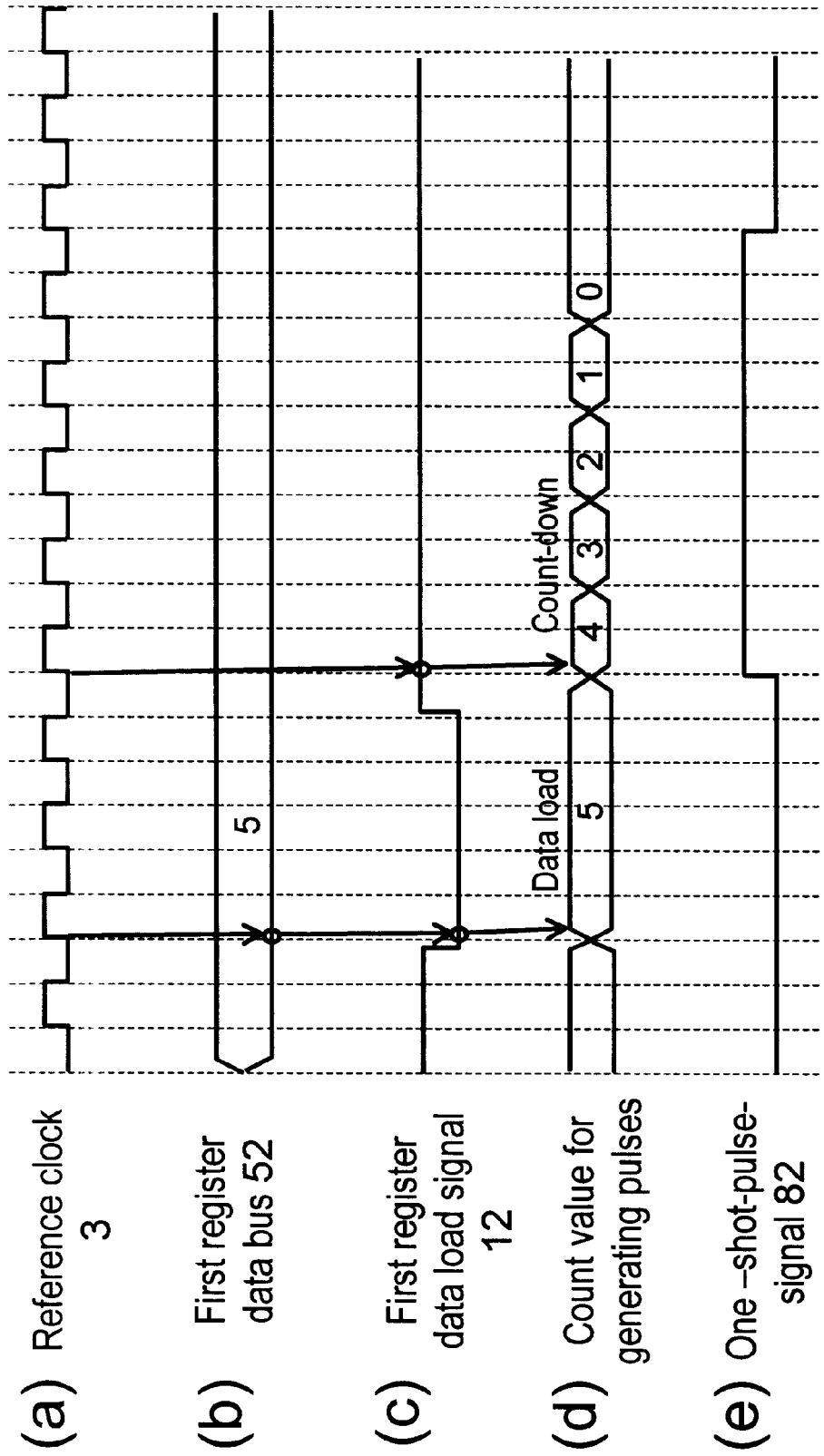

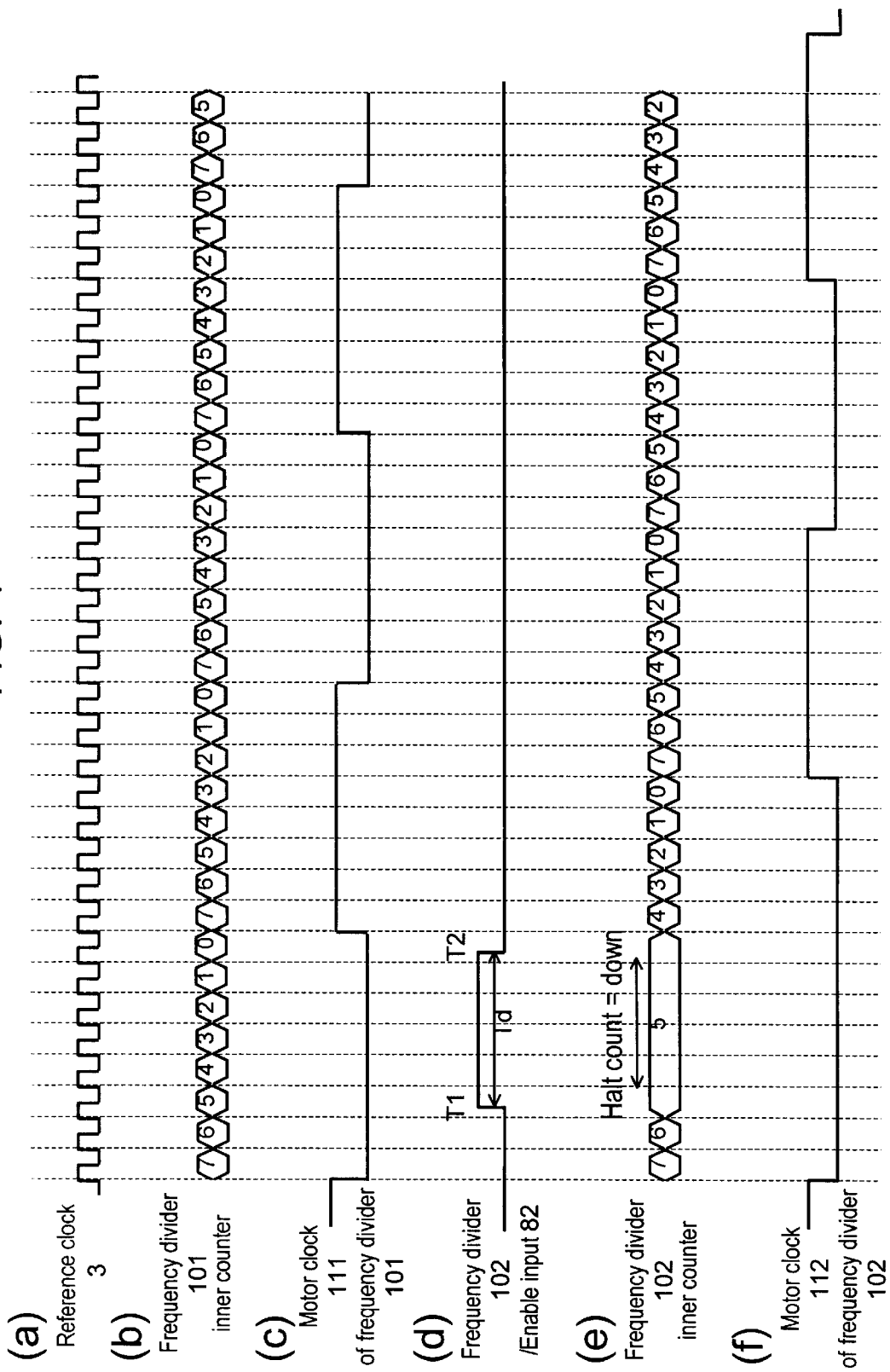

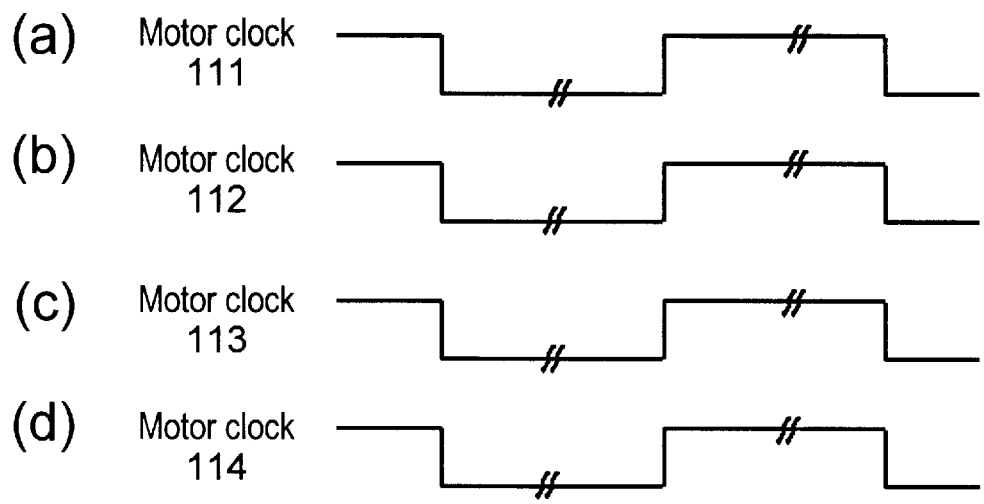
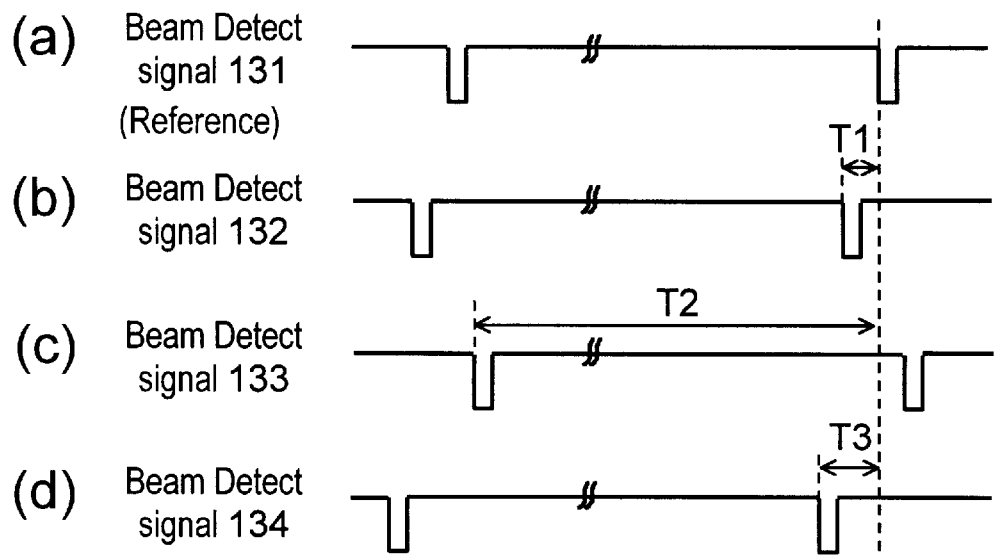

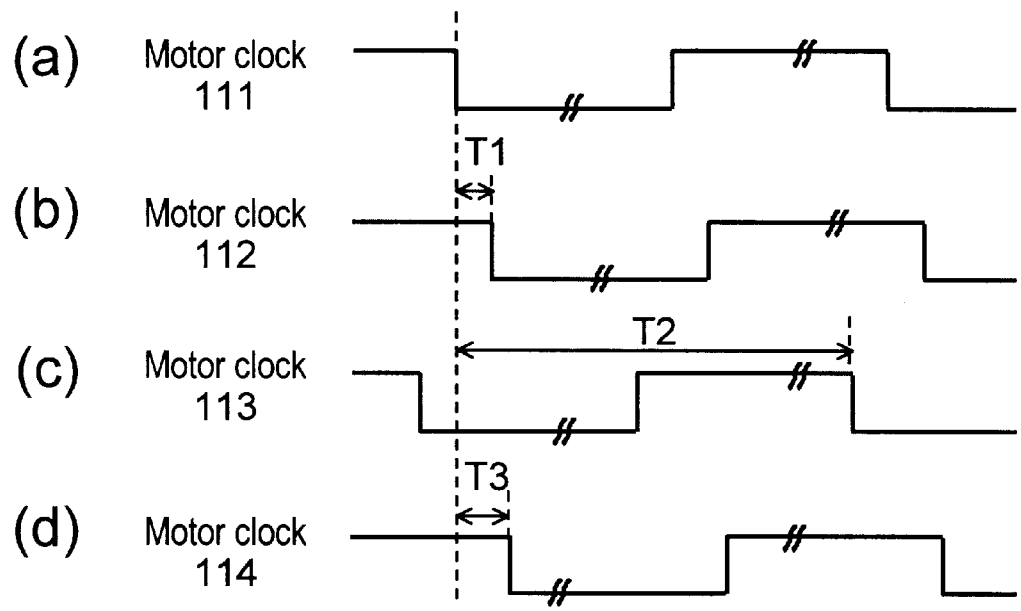
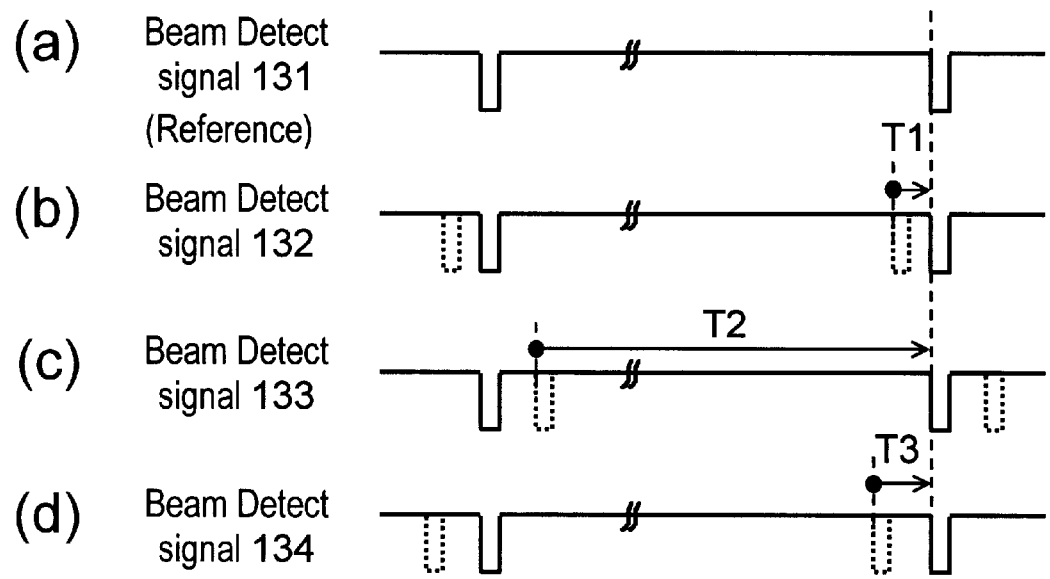

REGISTRY ADJUSTING DEVICE FOR LASER BEAM PRINTER

FIELD OF THE INVENTION

The present invention relates to a registry adjusting device for a multi-color laser beam printer equipped with a plurality of laser scanning units which scan a plurality of photo-conductive drums.

BACKGROUND OF THE INVENTION

Out-of-registration colors (image displacement) is an obstinate problem to a multi-color laser printer equipped with a plurality of laser scanning units. In order to obtain an accurate multi-color print onto a receiving medium by overcoming this problem, displacements in a main scan direction must be eliminated first of all. This elimination can be realized by matching scan-start-timings of the plural scanning units in the main scan direction. Respective rotary polygons provided to each scanning unit reflect the laser beam from the source to a photo-conductive drum. At this time, clocks driving motors that drive the polygons are started in phase. Assume that the number of rotations of the polygons agree with each other. However, the phases toward reflecting faces of respective polygons do not always agree with, and also the phases on the photo-conductive drums do not always agree with because of mounting errors of polygons as well as errors in rotating-detection-signals of the motors.

While the laser beam scans in main scan direction, the photo-conductive drums rotate, thus if the scanning starts with some time-lag, the drums have rotated by the angle corresponding to the time-lag, which causes deviation in sub-scan direction. In other words, time-lag in recording onto the drum in the main scan direction is reflected in the out-of-registry in the sub-scan direction. Even if the time-lag in the main scan direction is small, out-of-registry in the sub-scan direction must be corrected with the precision as high as not more than one pixel. A technique of correcting the out-of-registry in the sub-scan direction is disclosed in the Japanese Patent Application Non-examined Publication No. H07-160084. This technique teaches that sync circuits between respective scanning units are prepared responsive to phase control status of each motor driving the respective rotary polygons. Then timing signals for recording are generated with the precision as high as not more than one pixel.

However, this registry adjusting method according to the publication No. H07-160084 does not clarify a method of how to agree the timing signals of respective scanning units at the initial stage. The timing signals (=beam detect signal) are used for agreeing the recording timings of video signals in the main scan direction. The video signals can be obtained by receiving the laser beam from the respective scanning units. Out-of-registry of an image in the sub-scan direction can be adjusted with the precision not more than one pixel. However, it can be adjusted in a unit of, e.g. a half pixel or one quarter pixel, namely in a unit of one pixel divided by an integer, thus the image registry can be adjusted discontinuously.

In the registry adjusting device of a laser beam printer discussed above, it is required that the recording timing be adjusted continuously first of all, thereby controlling with accuracy the spin of motors that drive the rotary polygons.

SUMMARY OF THE INVENTION

The present invention addressed the problem discussed above and aims to provide a registry adjusting device of a laser beam printer (herein after called LBP). The registry adjusting device can correct an out-of-registry phase in the main scan direction by precisely controlling the spins of polygon-driving-motors equipped in respective laser scanning units.

The registry adjusting device of the present invention includes a plurality of laser scanning units and comprises the following elements:

(a) a reference clock generator;

(b) phase-difference-measuring circuit for measuring a time-lag of a plurality of timing signals for recording an image in a main scanning direction by counting a reference clock of the reference clock generator, the plurality of timing signals produced by receiving laser beam deflected by rotary polygons equipped in said plurality of laser scanning units;

(c) a plurality of registers storing a plurality of count values measured by the measuring circuit;

(d) a pulse generator for generating one-shot-pulse signal;

(e) frequency divider for dividing the reference clock with a predetermined rate into a frequency divided signal, and outputting the frequency divided signal as a motor clock that drives the rotary polygons; and (f) a controller for controlling an overall operation, where the controller inputs the one-shot-pulse-signal supplied from the pulse generator and corresponding to time-lag of the timing signals for recording an image in the main scanning direction into the frequency divider, and halts an operation of the frequency divider temporarily during an effective period of the one-shot-pulse-signal for independently controlling a phase of motor clock supplied from the frequency diver means in accordance with an accuracy of the reference clock.

The registry adjusting device having the construction discussed above can thus control the polygon-driving-motors with high accuracy, and correct out-of-registration phases in the main scan direction.

BRIEF DESCRIPTION OF THE DRAWINGS

FIG. 2 shows timing charts of (a) a reference clock, (b) a beam-detect-signal, (c) a beam detecting-signal, and (d) counted phase-difference-values and phase-difference-data.

FIG. 3 shows timing charts of (a) a reference clock, (b) data in a register-data-bus, (c) a register-data-load signal, (d) count numbers for generating pulses, and (e) a one-shot pulse signal.

FIG. 4 shows timing charts of (a) a reference clock, (b) count numbers by an inner counter of a frequency divider, (c) a motor clock supplied from the frequency divider, (d) input data at an enable-input-terminal of the frequency divider, (e) count numbers by an inner counter of another frequency divider, and (f) a motor clock supplied from the other frequency divider.

FIG. 5 shows timing charts of motor clocks.

FIG. 6 shows timing charts of (a) a reference beam-detect-signal and (b)–(d) respective beam-detect-signals.

FIG. 7 shows timing charts of respective motor-clocks.

FIG. 8 shows timing charts of (a) a reference beam-detect-signal and (b)–(d) respective beam-detect-signals.

DETAILED DESCRIPTION OF THE PREFERRED EMBODIMENTS

Exemplary embodiments of the present invention are described hereinafter with reference to the accompanying drawings.

(Exemplary Embodiment 1)

Figure 1:
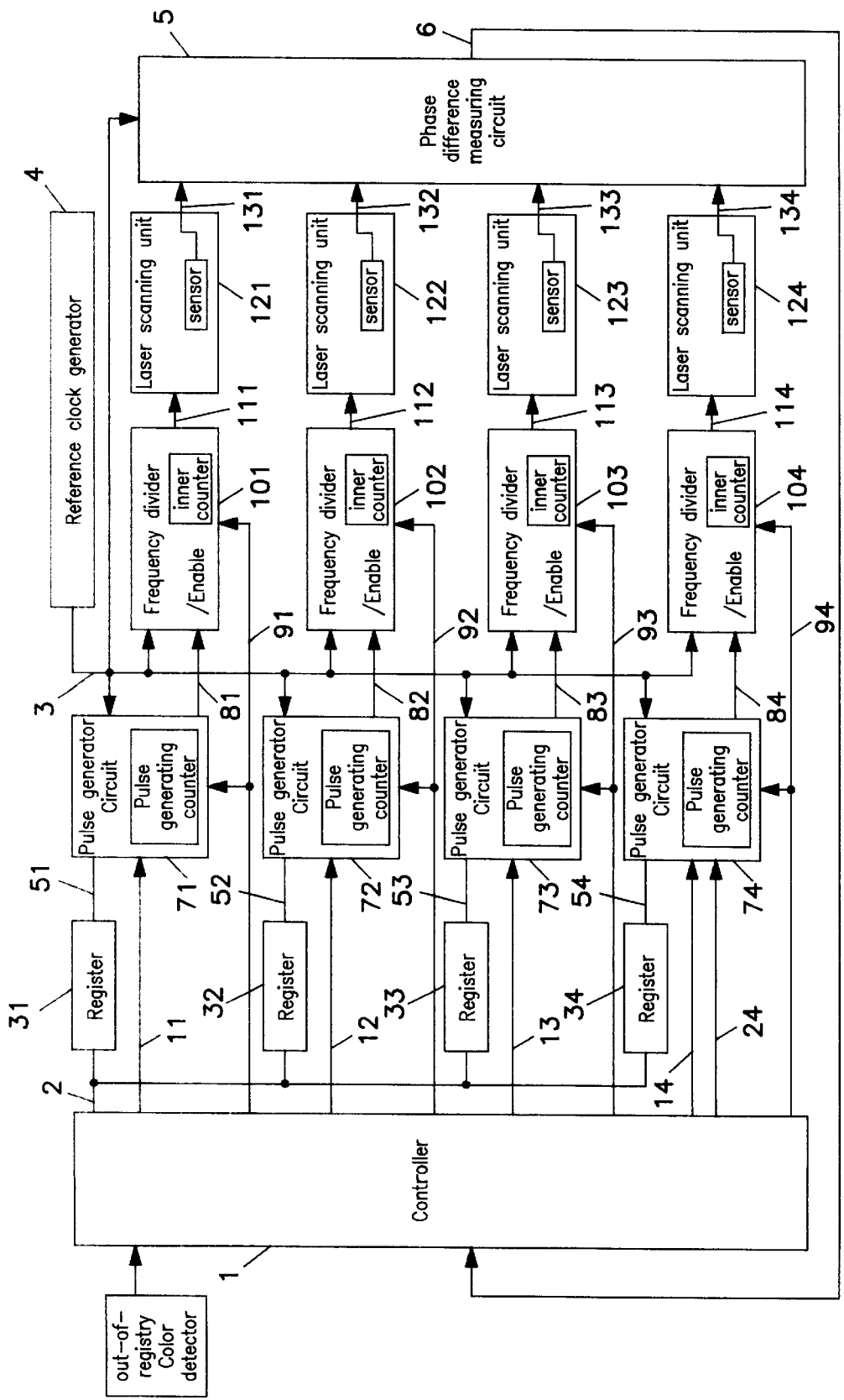
FIG. 1 is a block diagram illustrating a registry adjusting device of a laser beam printer (LBP) in accordance with the first exemplary embodiment of the present invention.

FIG. 1 is a block diagram illustrating a registry adjusting device of a laser beam printer (LBP) in accordance with the first exemplary embodiment of the present invention.

In FIG. 1, controller 1 controls the entire adjusting device. Reference-clock-generator 4 generates reference clock 3. Phase-difference-measuring circuit 5 receives beam-detect-signals (=record-timing-signal in the main scan direction), and measures time-lags of respective beam-detect-signals with reference to clock 3. The beam-detect-signals are generated by receiving the laser beam deflected from rotary polygons equipped to respective laser scanning units 121–124. The measuring point is a beam-detect-signal responsive to the color that encounters the widest out-of-registry. The beam-detect-signal has been detected by an out-of-registry color detector (not shown). The measured result is transmitted to controller 1 via data bus 6 of the phase-difference measuring circuit.

From controller 1 and through data bus 2, registers 31–34 receives counted phase-difference values corresponding to the time-lags of beam-detect-signals that are used as measuring points. The beam-detect-signals have been measured at the initial stage of phase-difference-measuring circuit 5. The stored count values are utilized for adjusting phases of respective beam-detect-signals responding to the base beam-detect-signals. This is detailed later.

Pulse generating circuits 71–74 generates one-shot pulses 81–84 by counting reference clock 3 supplied from reference-clock-generator 4. Reference clock 3 are supplied based on respective phase-difference-data (counted phase difference values) that have been loaded from registers 31–34 through register-data-buses 51–54. The loads are practiced when register-data-load-signals from controller 1 turn into active.

Controller 1 generates reset-signals 91–94 thereby resetting pulse-generating-circuits 71–74 and frequency dividers 101–104. Frequency dividers 101–104 divide reference clock 3 supplied from reference-clock-generating-circuit 4 with a given count numbers, and halt the dividing operation responsive to the period when one-shot pulses 81–84 are active. Motor clocks 111–114 for the motors that drive the rotary polygons are thus supplied with delay of this halting period.

Laser scanning units 121–124 corresponds to image-forming-devices (not shown) assigned to black, cyan, magenta and yellow respectively, and drives rotary polygons (not shown) of respective image-forming-devices by motor clocks 111–114 from frequency divider 101–104. Laser scanning units 121–124 then output beam-detect-signals 131–134 to phase-difference-circuit 5.

In FIG. 1, respective one-shot pulse signals 81–84 supplied from pulse-generating-circuits 71–74 are fed to enable-input-terminals (low active) of frequency dividers 101–104. In other words, when signals 81–84 are active (high), frequency dividers 101–104 are set to "disable" and stop dividing the frequency. When signals 81–84 are inactive, frequency dividers 101–104 are set to "enable" and practice dividing the frequency, thereby obtaining motor clocks 111–114, which are fed into respective laser scanning units 121–124.

An operation of the registry adjusting device having a construction discussed above is described hereinafter with reference to FIG. 2–FIG. 4. In order to simplify the description, adjusting the phases of beam-detect-signals 131 and 132 in laser scanning units 121 and 122 is taken as an example.

FIG. 2 illustrates an operation of phase-difference-measuring-circuit 5. FIG. 2($a$) is a timing chart of reference clock 3, FIG. 2($b$) is a timing chart of beam-detect-signal 132, FIG. 2($c$) is a timing chart of beam-detecting-signal 131, and FIG. 2($d$) is timing chart of counted phase-difference-values and phase-difference-data.

FIG. 3 illustrates an operation of pulse-generating-circuit 72. FIG. 3($a$) is a timing chart of reference clock 3, and FIG. 3($b$) is a timing chart showing data in register-data-bus 52. FIG. 3($c$) is a timing chart of register-data-load signal 12, FIG. 3($d$) is a timing chart of count numbers for generating pulses, and FIG. 3($e$) is a timing chart of one-shot pulse signal 82.

FIG. 4 illustrates an operation of frequency dividers 101 and 102. FIG. 4($a$) is a timing chart of reference clock 3, FIG. 4($b$) is a timing chart of count numbers by an inner counter of frequency divider 101, and FIG. 4($c$) is a timing chart of motor clocks 111 supplied from frequency divider 101. FIG. 4($d$) is a timing chart of input data at an enable-input-terminal of frequency divider 102, and FIG. 4($e$) is a timing chart of count numbers by an inner counter of frequency divider 102. Finally, FIG. 4(f) is a timing chart of motor clocks 112 supplied from frequency divider 102.

In FIG. 2, when a phase difference of beam-detect-signal 132 is measured with regard to beam-detect-signal 131, the phase difference is counted with reference to reference clock 3. This measurement is performed by circuit 5 as follows start a counting operation by circuit 5 at a rising edge (point A) of the reference clock 3 when beam-detect-signal 132 turns into "active" (low). Then, end the counting operation at a rising edge (point B) of the reference clock 3 when beam-detect-signal 131 turns into "active" (low), and retains the counted phase-difference-value "5". Circuit 5 thus can measure time-lag of beam-detect-signal 132 with regard to beam-detect-signal 131 that is a measuring point, where beam-detect-signal 131 serves as a reference signal. In order to match the phase of signal 132 with that of signal 131 that is a base signal, the phase of signal 132 should be delayed for a period corresponding to the counted value "5". This delaying operation is described hereinafter.

In FIG. 1, controller 1 reads a counted value of phase difference retained in phase-difference-measuring circuit 5 via data bus 6, and sets the value in register 32 via data bus 2.

In FIG. 3, circuit 5 measures the counted value "5" of phase difference, and register 32 temporarily stores the counted value "5", which is supplied to data bus 52. The data "5" outputted from data bus 52 is loaded to pulse generating circuit 72 when register-data-load-signal 12 turns into "active" (low). When signal 12 turns into "inactive" (high), a pulse-generating-counter within circuit 72 starts count-down operation with reference to reference clock 3. During the count-down operation (in FIG. 3($d$), a period from counted value "4" to "0"), circuit 72 outputs one-shot-pulse-signal 82 at a high level. As such, pulse-generating-circuit 72 outputs one-shot-pulse-signal 82 corresponding to the data set in register 32 every time when register-data-load-signal 12 turns into active (low).

The operation of circuit 72 is discussed above, and pulse-generating-circuits 71, 73 and 74 operate in the same manner as circuit 72.

One-shot-pulse-signal 82 is fed into the enable-input-terminal (low active) of frequency divider 102, which is set to "disable" (stop) when signal 82 is high active. When signal 82 is low active, circuit 102 is set to "enable" and divides frequencies.

In FIG. 4, the output frequencies of frequency dividers 101 and 102 are set at ¹/₁₆ of reference clock 3 only the operation of frequency dividers 101 and 102 is described in order to simplify the description. Dividers 101 and 102 reverse their outputs every time when down-counters (not shown) of dividers 101 and 102 count 8 (7 to 0).

In FIG. 4, when one-shot-pulse-signal 82 supplied from pulse-generating-circuit 72 is set to active (high level, time T1 in FIG. 4(d)), the down-counter (not shown) for frequency dividing of frequency divider 102 is set to "disable" (stop) and the down-counter temporarily halts its operation (during "Td"). When one-shot-pulse-signal 82 turns into low level (at "T2") after a period corresponding to "5" counts of reference clock 3, an enable input of divider 102 becomes "active", then the inner down-counter (not shown) of divider 102 starts operation again. As such, frequency divider 102 halts its operation temporarily while signal 82 (high level) is supplied, and motor-clock 112 (FIG. 4 (f)) which is an output of divider 102 retains the halt status during this halting period. As a result, the period where a phase of motor clock 112 can be delayed (in this case, a period of count "5" of the reference clock can be delayed). In other words, the duty of motor clock 112 is varied only during this period. Motor clock 112 of frequency divider 102 is delayed with regard to motor clock 111 of divider 101 by "5" counts of reference clock, and then supplied, as its driving clock, to the rotary polygon (not shown) of laser scanning unit 122. The phase of beam-detect-signal 132 thus delays by "5" counts of reference clock, the phase of signal 132 can be adjusted to agree with that of signal 131 that is the reference signal.

In this case discussed above, the output frequencies of dividers 101 and 102 were set at ¹/₁₆ of reference clock 3 only the operation of frequency dividers 101 and 102 is described in order to simplify the description. However, the output frequency can be arbitrarily set responsive to the driving motors of rotary polygons of laser scanning units 121 and 122. The phase of beam-detect-signal 132 was described to be agreed with that of signal 131; however, respective phases of a plurality of beam-detect-signals can be agreed with an arbitrary reference beam-detect-signal. These descriptions can be also applied to the following embodiments.

According to the first exemplary embodiment discussed above, based on the one-shot-pulse-signals 81–84 supplied from pulse-generating-circuits 71–74, frequency dividers 101–104 vary the duties of motor-clock 111–114 temporarily, thereby controlling the phases of motor-clocks 111–114. The phase of driving motors of rotary polygons can be thus controlled. As a result, the phase of beam-detect-signal (timing signal for recording an image in the main scan direction) can be controlled, and thus the out-of-registry phases in the main scan direction can be corrected.

(Exemplary Embodiment 2)

A registry adjusting device of a laser beam printer (LBP) in accordance with the second exemplary embodiment has the same construction as shown in FIG. 1. An operation of controller 1 only differs from that in the first embodiment.

Figure 9:
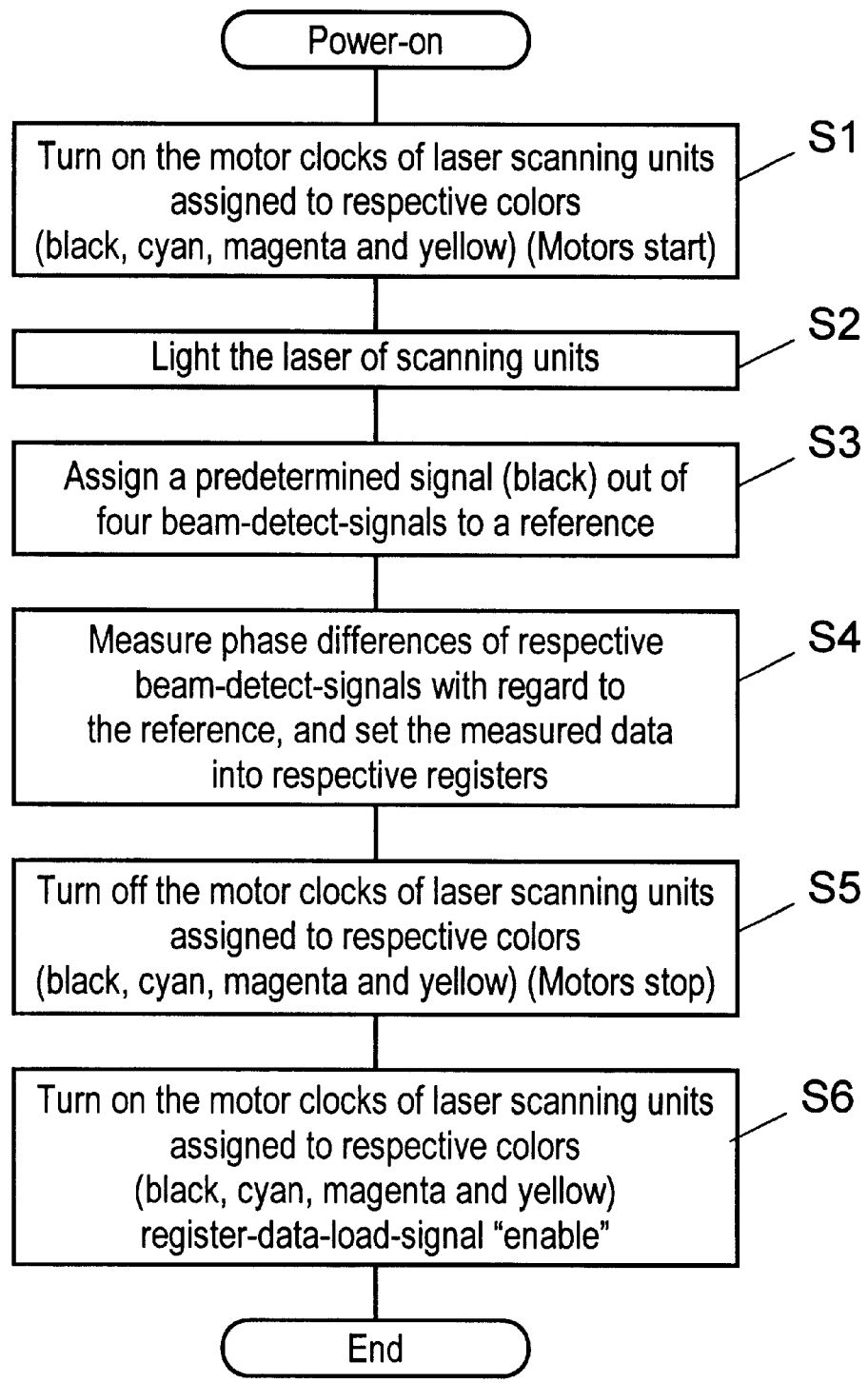
FIG. 9 is a flowchart illustrating an operation of the controller of registry adjusting unity in accordance with the second embodiment.

The registry adjusting device of a LBP used in the second exemplary embodiment is described with reference to FIGS. 5–FIG. 9. FIGS. 5 and 6 are timing charts before phase collection is executed, and FIGS. 7 and 8 are timing charts after phase collection is executed. FIG. 5(a) is a timing chart of motor clock 111, FIG. 5((b) is a timing chart of motor clock 112, FIG. 5(c) is a timing chart of motor clock 113, and FIG. 5(d) is timing chart of motor clock 114. FIG. 6(a) is a timing chart of beam-detect-signal (reference signal) 131, FIG. 6(b) is a timing chart of beam-detect-signal 132, FIG. 6(c) is a timing chart of beam-detect-signal 133, and FIG. 6(d) is a timing signal of beam-detect-signal 134. FIG. 7(a)–FIG. 7(d) are timing charts of motor-clocks 111–114 respectively. FIG. 8(a)–FIG. 8(d) are timing charts of beam-detect-signals 131–134 respectively, and signal 131 is a reference signal. FIG. 9 is a flowchart illustrating an operation of controller 1 of registry adjusting unity in accordance with the second embodiment.

In FIG. 1 and FIG. 9, the adjusting device is powered first of all. Then, when reset signals 91–94 are turned into "inactive", pulse-generating circuits 71–74 do not output one-shot-pulse-signal (high) because counted values of phase-differences are not loaded into registers 31–34 at the initial stage. One-shot-pulse-signals 81–84 thus stay low. Respective frequency dividers 101–104, which is set to "enable" when signals 81–84 are low, start dividing the frequencies of reference clock 3 and outputs the divided clocks as motor-clocks 111–114 (S1). Then respective motors (not shown), which drive the rotary polygons (not shown) within laser scanning units corresponding to each color, start rotating. After the spinning of motors become stable, each laser of respective units is lit (S2), then respective sensors within the units receive laser beam and output beam-detect-signals 131–134, which eventually turn into timing signals for recording in a main scanning direction. In this case, as shown in FIG. 5, respective motor clocks 111–114 are supplied in phase to the motors driving the rotary polygons within laser scanning units 121–124 so that the motor clocks control the polygon motors and the number of motor rotations agree with each other Indeed at an initial stage, this arrangement can cause the number of rotations of polygons to agree with each other however, respective beam-detect-signals 131–134 are supplied in out-of-registry phases as shown in FIG. 6 due to errors of mounting the polygons to their driving motors as well as errors of rotation-detect-signals of polygon motors. This out-of-registry phase is also caused by another factor, i.e. the polygons are not in phase in their reflecting directions although they maintain a certain phase relation.

In this status discussed above, phase-difference-measuring-circuit 5 sets beam-detect-signal 131 supplied from laser scanning unit 121 as a reference (S3). Then circuit 5 measures respective phase-differences between beam-detect-signals 132, 133, 134 and reference signal 131 (periods of T1, T2 and T3 in FIG. 6) as count values, and sets the count values in the corresponding registers 32, 33, and 34 (S4).

Next, reset signals 91–94 are turned into "active", and the operations of pulse-generating-circuits 71–74 and frequency dividers 101–104 are halted temporarily. Then respective motor clocks 111–114 are turned off. After that, reset signals 91–94 are turned into "inactive", then register-data-load-signals 12, 13 and 14 are turned into "active", and the data stored in registers 32, 33 and 34 are loaded to circuits 71–74 respectively. Frequency dividers 102–104 output motor clocks 111–114 again with a delay corresponding to the data stored in register 32–34 (S6). Register-data-load-signals 12–14 are turned into "active", and the phase-difference-data stored in registers 32–34 are loaded to the signals 12–14, then pulse-generating-circuits 72–74 output high level one-shot-pulse-signals 82–84 corresponding to the phase-difference-data. In this case, since beam-detect-signal 131 corresponding to black color is utilized as a reference signal, phase-difference-data "0" is set in register 31 which is assigned to the black color. Pulse-generating-circuit 71 thus does not generate one-shot-pulse-signal and the signal thereof stays low.

The phase of motor clock 111 supplied from frequency divider 101 does not vary, and motor clocks 112–114 are outputted with a phase delay of T1, T2 and T3 respectively as shown in FIG. 7. Because frequency dividers 102–104 are halted (disable) temporarily for the period of respective one-shot-pulse-signals 82–84. Motor-clocks 112–114 are thus always supplied to respective motors with the phase delay of T1, T2 and T3, and rotating phases of respective rotary polygons in the reflecting directions can be corrected by controlling the spin of motors. As a result, phases of respective beam-detect-signals 132–134 are adjusted (by delaying T1, T2 and T3 respectively) so that signals 132–134 can be in phase with signal 131 assigned to the black color, as shown in FIG. 8.

According to the second exemplary embodiment discussed above, the phase differences of beam-detect-signals 132–134 with regard to the reference signal 131, are measured and set in the registers, whereby the phases of respective signals 132–134 can be in phase with the reference signal 131. Further, motor clocks 111–114 are temporarily turned off, and when they are turned on again, the phases of respective motor clocks 111–114 are adjusted so that the polygon motors can be prevented from defective controls over rotary polygons. The defective controls sometimes occur due to a phase change of the motor clocks by a large volume in a dynamic way when the polygon motors are operated.

(Exemplary Embodiment 3)

Figure 10:
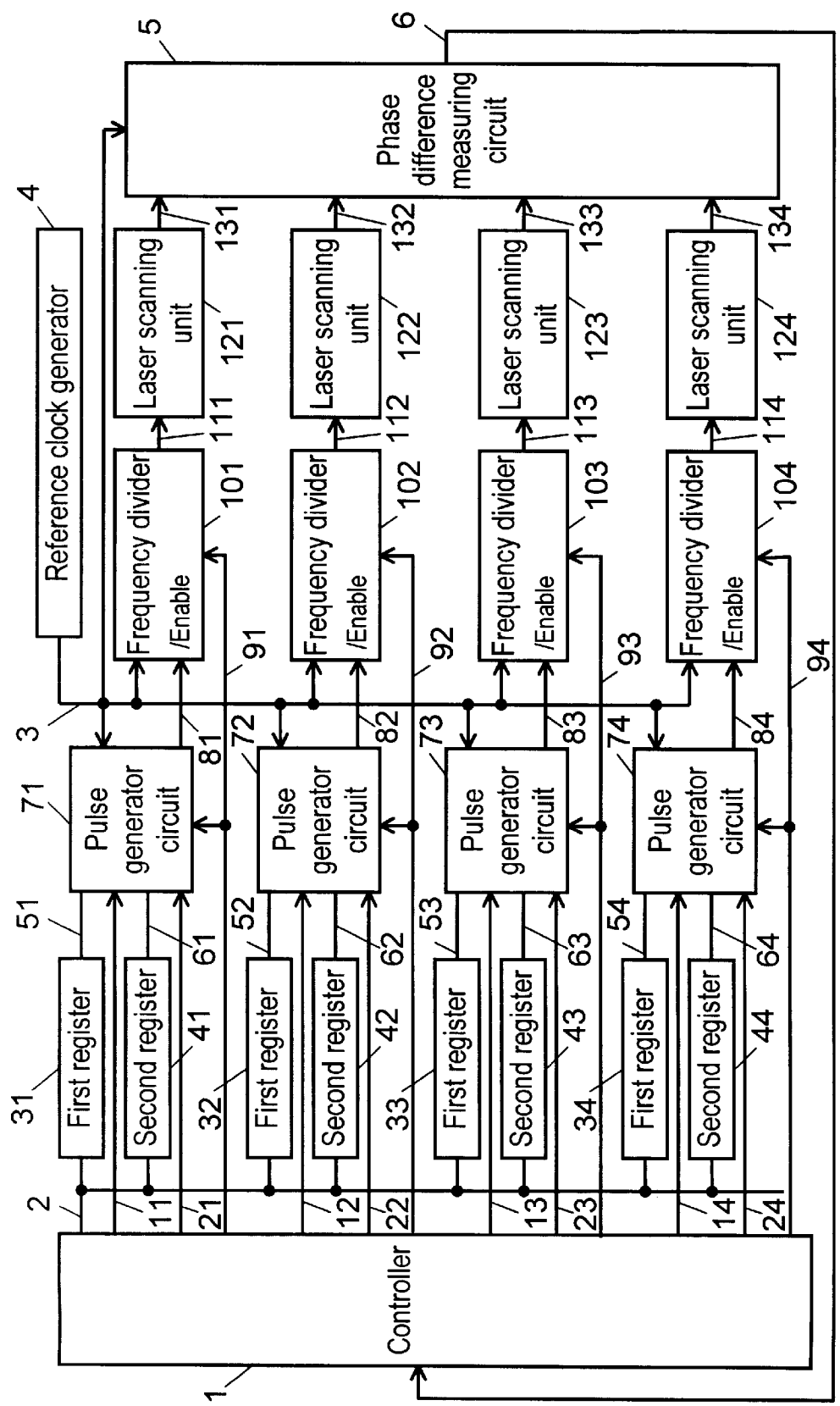
FIG. 10 is a block diagram illustrating a registry adjusting unity in accordance with the third embodiment.

FIG. 10 is a block diagram illustrating a registry adjusting device in accordance the third exemplary embodiment of the present invention. In FIG. 10, the elements in FIG. 1 are denoted with the same reference numbers, and the descriptions thereof are omitted.

Second registers 41–44 are newly added to registers 31–34 shown in FIG. 1. Registers 31–34 are referred to as "first registers" hereinafter. Second registers 41–44 are provided for improving the accuracy of adjusting the phases of respective beam-detect-signals 131–134 supplied from the laser scanning units. In addition to the phase adjustment described in the second embodiment (first step adjustment), second registers 41–44 are provided in which the phase differences with regard to the reference beam-detect-signal are to be stored for second step adjustment. The phase differences are counted by circuit 5 as described in the second embodiment 2.

When second-register-data-load-signals 21–24 turn into "active", pulse-generating-circuits 71–74 can load the data (counted phase differences) stored in second registers 41–44 to themselves via second-register-data-bus 61–64.

Figure 11:
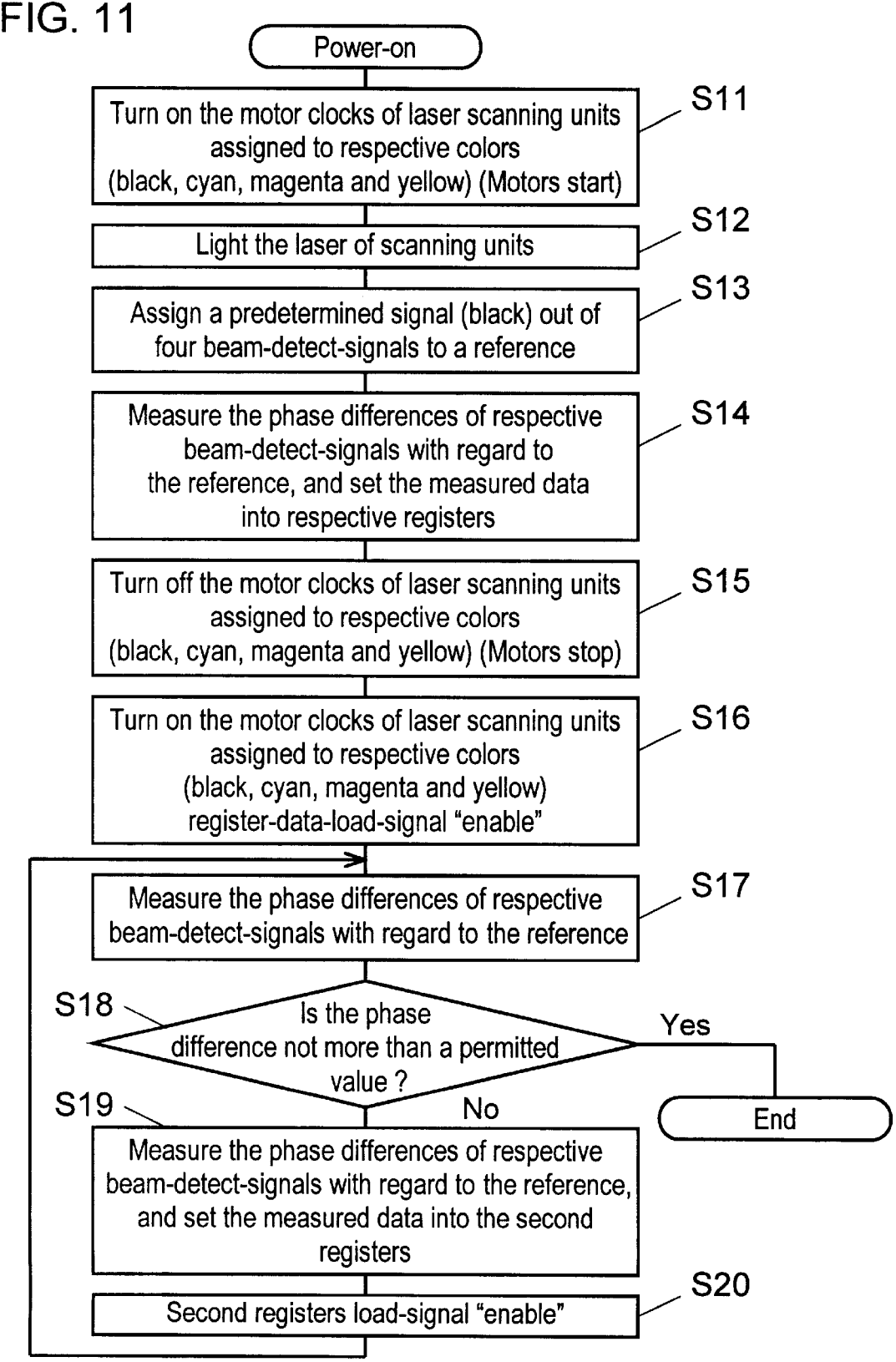
FIG. 11 is a flowchart depicting an operation of the registry adjusting device of a laser beam printer.

An operation of the registry adjusting device so constructed discussed above is described hereinafter with reference to FIG. 11. FIG. 11 is a flowchart depicting an operation of the registry adjusting device of a laser beam printer. In FIG. 11, the operations depicted in S11 through S16 are the same as those in S1 through S6 shown in FIG. 9 described in the second embodiment, and the descriptions are omitted here.

In the first step of phase-adjustment (S11 through S16), the phases of respective beam-detect-signals 132–134 have been basically adjusted with regard to the reference signal 131. However, when those phases are not completely agreed with each other due to errors of rotation-detect-signals of polygon motors, the phase differences of beam-detect-signals 132–134 with regard to the reference beam-detect-signal 131 are measured (S17) after the first adjustment step for improving the adjustment accuracy. If the measured differences are not more than a given permitted value, the operation goes to "end". If the measured values exceed the given permitted value, the phase difference data are stored in second registers 42–44 (S19). Then, the second register-data-load-signals 22–24 are turned into "active", to which the stored data are loaded. Pulse-generating-circuits 72–74 output one-shot-pulse-signals 82–84 at a high level for a period corresponding to one-shot-pulse-signals 82–84, which is the same operation as the first registers did. Therefore, frequency dividers 102–104 halt (disable) their dividing operations temporarily for the period corresponding to one-shot-pulse-signals 82–84, and motor clocks 112–114, which are the outputs of the frequency dividers, are supplied to the polygon motors with the delays of the same period as discussed above. Rotating phases of the rotary polygons can be corrected in the reflecting direction by the motor control over the rotations of polygons. The operations (S17 through S20) discussed above are repeated until the phase differences are lowered to not more than the given permitted value.

According to the third embodiment discussed above, after the first step of phase adjustment, the second adjustment step is prepared for the case requiring further adjustments, whereby the more accurate adjustment can be achieved. In the first adjustment step, when motor clocks 111–114 are turned on again after they were turned off temporarily, the phases of respective motor clocks 111–114 are adjusted so that the polygon motors can be prevented from defective controls over rotary polygons. The defective controls sometimes occur due to a phase change of the motor clocks by a large volume in a dynamic way when the polygon motors are operated. In the second adjustment step, since the phases have been adjusted to a certain degree of accuracy, phase changes by large volume of motor clocks are not needed. The clock phases can be thus finely adjusted in a dynamic way when polygon motors are operated.

(Exemplary Embodiment 4)

The data stored in the registers described in the first to third embodiments are vaporized when the registers are powered off. Therefore, whenever the registers are powered on, the steps shown in FIG. 11 must be operated. However, the registers can comprise non-volatile memories, thereby eliminating Step 14 shown in FIG. 11 and realizing a faster process. In the meantime, Step 14 includes the measurement of phase differences of respective beam-detect-signals with regard to the reference signal.

According to the fourth embodiment discussed above, measuring the time lags of beam-detect-signals is not required every time when the registers are powered on. Based on the time lags stored in the first and second registers, the phases of beam-detect-signals can be adjusted with high accuracy, so that the phases can be agreed with the reference signal.

The respective embodiments previously discussed are described with discrete circuits; however, part of those operations or the entire operations can be programmed in a micro-computer.

What is claimed is:

1. A registry adjusting device for use with a plurality of laser scanning units in a laser beam printer, said device comprising:

(a) a reference clock generator;

(b) phase-difference-measuring means for measuring a time-lag of a plurality of timing signals for recording an image in a main scanning direction by counting a reference clock supplied from said reference clock generator between said timing signals, and thereby said measuring means provides a plurality of count values, the plurality of timing signals produced by sensors, each of the sensors receiving a laser beam deflected by rotary polygons in said plurality of laser scanning units;

(c) a plurality of registers storing said plurality of count values provided by said phase-difference measuring means;

(d) frequency dividing means for dividing the reference clock by some value into a frequency divided signal, and outputting the frequency divided signal as a motor clock that drives the rotary polygons and (e) a pulse generator for generating a pulse to the frequency dividing means during a period equal to said count value of the reference clock so that operation of said frequency dividing means is halted during said period in order to adjust a rotation of rotary polygons.

2. The registry adjusting device as defined in claim 1 wherein a controller sets as a reference signal one of the timing signals for recording an image in the main scanning direction, and stores the count values of time-lags of respective timing signals with regard to the reference signal into said registers, then halts the operation of said frequency dividing means temporarily and starts the operation again with a delay corresponding to the count values of the time-lags stored in said registers for adjusting phases of the respective timing signals with regard to the reference signal.

3. The registry adjusting device as defined in claim 2 wherein said registers are a non-volatile-memory.

4. The registry adjusting device as defined in claim 1, wherein said registers are first registers, further comprising a further plurality of second registers, wherein a controller sets predetermined one of the timing signals as a reference signal for the timing signals for recording an image in the main scanning direction, and stores the count values of the time-lags of respective timing signals with regard to the reference signal into said first registers, then halts temporarily the operation of said frequency dividing means based on stored data in said first registers, and starts the operation again with a delay corresponding to the count values of the time-lags stored in the first registers for adjusting phases of the respective timing signals to be in phase with the reference signal, then said second registers store data corresponding to time-lags measured by said phase-difference-measuring means, and inputs one-shot-pulse-signals corresponding to the data stored in said second registers as a disable input into said frequency dividing means for halting temporarily said frequency dividing means, then varies temporarily duties of motor clocks for delaying phases of the motor clocks for further adjusting the phases.

5. The registry adjusting device as defined in claim 4 wherein said first registers and said second registers are a non-volatile-memory.

6. The registry adjusting device as defined in claim 1 wherein said registers are a non-volatile-memory.

* * * * *